US012601955B2

(12) United States Patent (10) Patent No.: US 12,601,955 B2
Itagaki et al. (45) Date of Patent: Apr. 14, 2026

(54) DRIVING DEVICE, OPTICAL ELEMENT DRIVING DEVICE, CAMERA MODULE, AND CAMERA-EQUIPPED DEVICE

(71) Applicants: Yoichi Itagaki, Tokyo (JP); Hiroyuki Ujiie, Tokyo (JP); Shun Tsuchiya, Tokyo (JP); Fumiko Wako, Tokyo (JP)

(72) Inventors: Yoichi Itagaki, Tokyo (JP); Hiroyuki Ujiie, Tokyo (JP); Shun Tsuchiya, Tokyo (JP); Fumiko Wako, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 197 days.

(21) Appl. No.: 18/732,830

(22) Filed: Jun. 4, 2024

(65) Prior Publication Data

US 2024/0419053 A1 Dec. 19, 2024

(30) Foreign Application Priority Data

Jun. 16, 2023 (JP) ................................. 2023-099684

(51) Int. Cl.
G03B 3/10 (2021.01)
G03B 5/00 (2021.01)

(52) U.S. Cl.
CPC ................. *G03B 3/10* (2013.01); *G03B 5/00* (2013.01); *G03B 2205/0007* (2013.01); *G03B 2205/0061* (2013.01)

(58) Field of Classification Search
CPC .... G03B 3/10; G03B 5/00; G03B 2205/0007; G03B 2205/0061
See application file for complete search history.

(56) References Cited

FOREIGN PATENT DOCUMENTS

JP       2010-063349        3/2010
KR       20120054446 A  *  5/2012    ............... G03B 3/02

* cited by examiner

*Primary Examiner* — Minh Q Phan
(74) *Attorney, Agent, or Firm* — LEX IP MEISTER, PLLC

(57) ABSTRACT

A driving device includes a resonance unit that has a pair of arm portions and resonates with vibration of a piezoelectric element, and a moving portion that abuts the pair of arm portions and is moved relative to the resonance unit due to vibration of the resonance unit, wherein a portion of the resonance unit and a portion of the moving portion that abut each other are each made of ceramic, and each of the pair of arm portions has, as a portion that abuts the moving portion, a sphere made of ceramic.

7 Claims, 5 Drawing Sheets

DRIVING DEVICE, OPTICAL ELEMENT DRIVING DEVICE, CAMERA MODULE, AND CAMERA-EQUIPPED DEVICE

INCORPORATION BY REFERENCE

This application is based upon, and claims the benefit of priority from, corresponding Japanese Patent Application No. 2023-099684 filed in the Japan Patent Office on Jun. 16, 2023, the entire contents of which are incorporated herein by reference.

BACKGROUND OF THE INVENTION

Technical Field

The present invention relates to a driving device, an optical element driving device, a camera module, and a camera-equipped device.

Background Art

A driving device such as an ultrasonic motor including a piezoelectric element is proposed as a driving device that drives an optical element in a camera module mounted on a camera-equipped device such as a smartphone or a drone.

For example, Japanese Unexamined Patent Application Publication No. 2010-63349 discloses a driving device including a bending displacement member that includes a piezoelectric element, a friction member that is provided at a free end of the bending displacement member, a driven body that abuts the friction member by a precompression mechanism, and the like. In the driving device, the precompression mechanism causes the friction member and the driven body to abut each other, and when a voltage is applied to the bending displacement member (piezoelectric element) to drive the bending displacement member and cause bending displacement (vibration) of the bending displacement member, the driven body is moved by a frictional force between the friction member and the driven body.

SUMMARY OF THE INVENTION

As described in Japanese Unexamined Patent Application Publication No. 2010-63349, in a driving device driven by a piezoelectric element, a driven body is moved while a friction member and the driven body are in frictional contact with each other. Thus, the members in frictional contact with each other generate a louder driving sound than other driving devices, for example, a driving device including a voice coil motor or the like.

An object of the present invention is to provide a driving device, an optical element driving device, a camera module, and a camera-equipped device that achieve a less driving sound generated by members during driving using a piezoelectric element.

A driving device according to the present invention includes: a resonance unit that has a pair of arm portions and resonates with vibration of a piezoelectric element; and a moving portion that abuts the pair of arm portions and is moved relative to the resonance unit due to vibration of the resonance unit, wherein a portion of the resonance unit and a portion of the moving portion that abut each other are each made of ceramic, and each of the pair of arm portions has, as a portion that abuts the moving portion, a sphere made of ceramic.

An optical element driving device according to the present invention includes: a holding portion that is capable of holding an optical element; a housing portion that houses the holding portion so that the holding portion is movable in an optical path direction of the optical element; and the driving device that drives the holding portion.

A camera module according to the present invention includes: the optical element driving device; and an imaging unit that captures a subject image using the optical element.

A camera-equipped device according to the present invention is a camera-equipped device that is an information device or a transportation device, the camera-equipped device including: the camera module; and an image processing unit that processes image information obtained by the camera module.

The present invention achieves a less driving sound generated by members during driving using a piezoelectric element.

DESCRIPTION OF THE EMBODIMENTS

Embodiments of the present invention will be described below in detail with reference to the drawings.

[Smartphone]

Figure 1A:
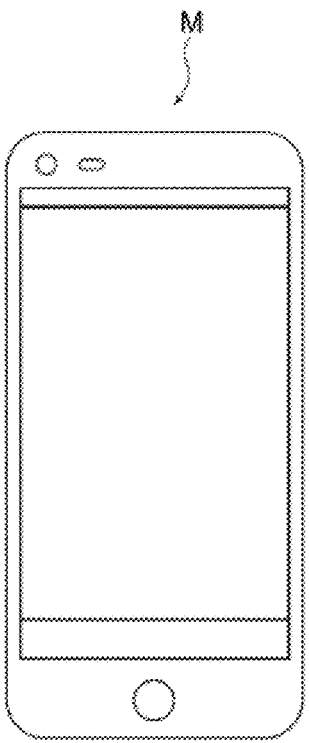
FIG. 1A is a front view of a smartphone equipped with a camera module according to an embodiment of the present invention.
Figure 1B:
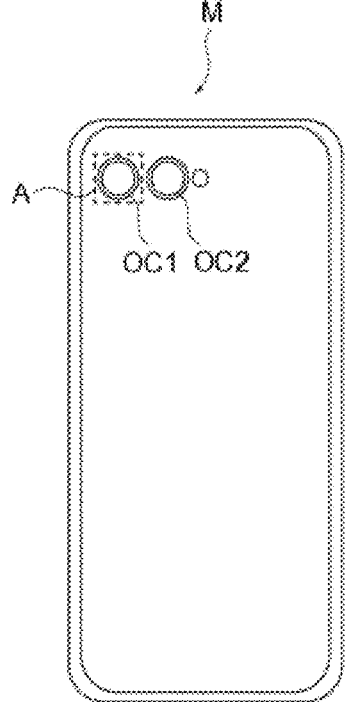
FIG. 1B is a rear view of the smartphone illustrated in FIG. 1A.

FIGS. 1A and 1B are diagrams illustrating a smartphone M (an example of a camera-equipped device) that is equipped with a camera module A according to the present embodiment. FIG. 1A is a front view of the smartphone M, and FIG. 1B is a rear view of the smartphone M.

The smartphone M includes a dual camera composed of two rear cameras OC1 and OC2. In the present embodiment, the camera module A is applied to the rear cameras OC1 and OC2.

The camera module A has an AF function, and is capable of performing automatic focusing to capture an image of a subject. The camera module A may have a shake correction function (hereinafter referred to as an "optical image stabilization (OIS) function"). The OIS function makes it possible to optically correct shake (vibration) occurring during image capture and capture an unblurred image.

[Camera Module]

Figure 2:
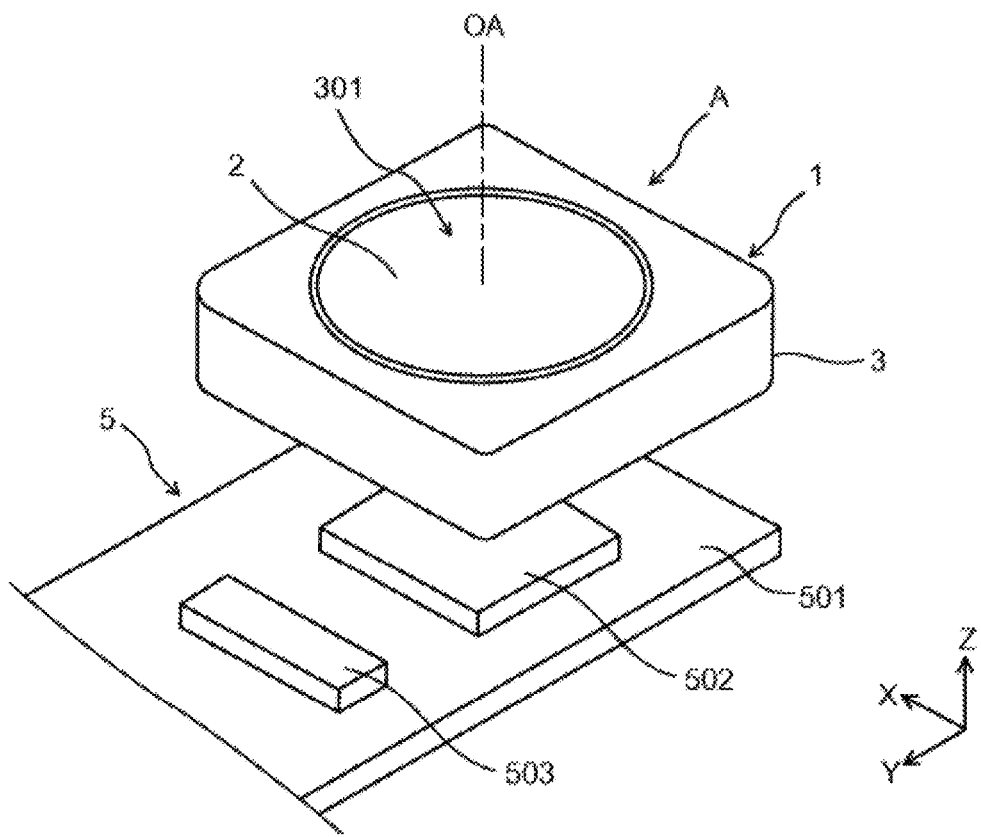
FIG. 2 is a perspective view of the camera module and an imaging unit.
Figure 3:
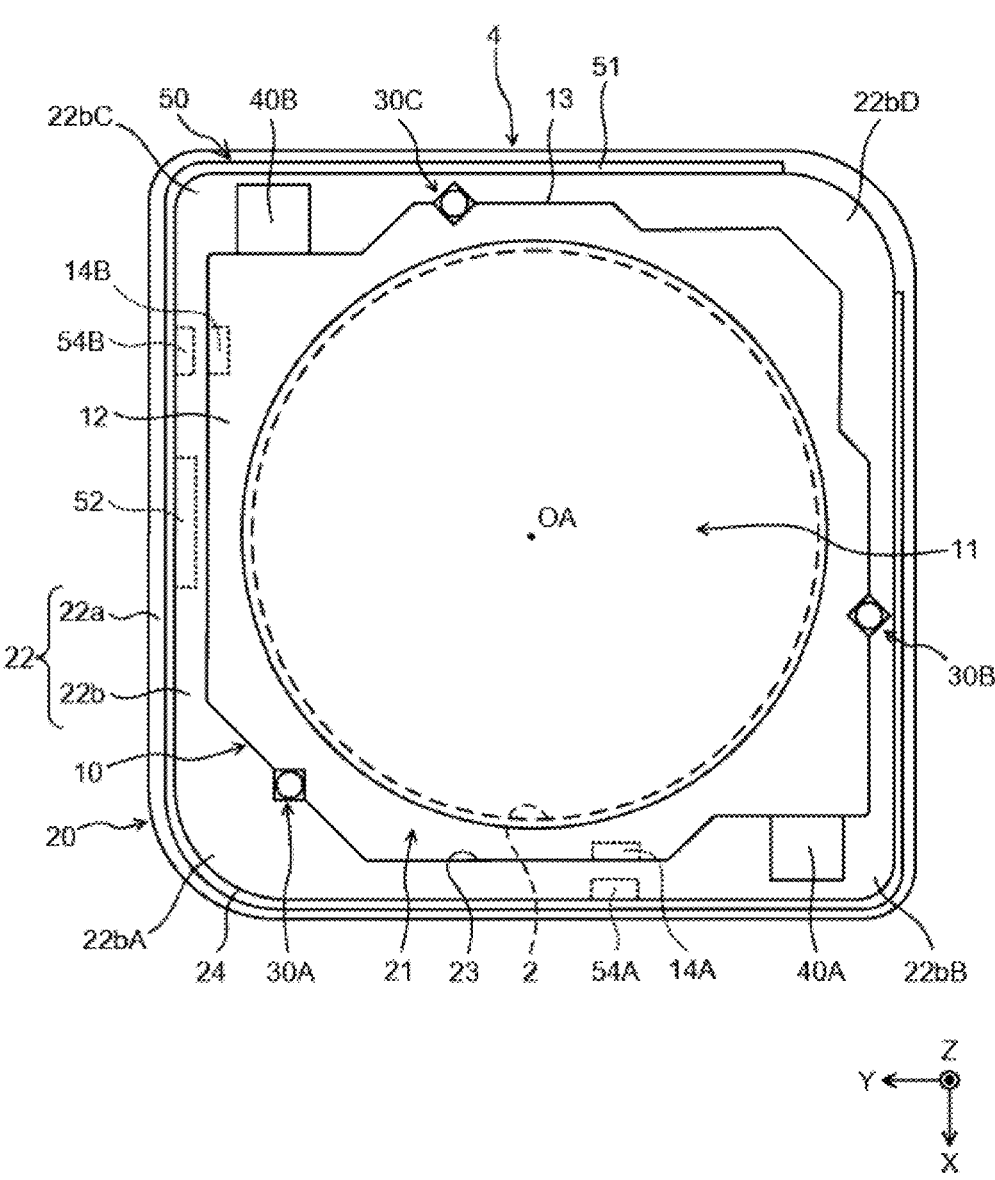
FIG. 3 is a plan view of an optical element driving device body of an optical element driving device of the camera module.

FIG. 2 is a perspective view of the camera module A and an imaging unit 5. FIG. 3 is a plan view of an optical element driving device body 4 of an optical element driving device 1 of the camera module A illustrated in FIG. 2. As illustrated in FIGS. 2 and 3, the present embodiment will be described using an orthogonal coordinate system (X, Y, Z). The orthogonal coordinate system (X, Y, Z) is also used in the figures below.

The camera module A is mounted on the smartphone M so that, for example, when an image is captured using the smartphone M, the X direction corresponds to the up-down direction (or the left-right direction), the Y direction corresponds to the left-right direction (or the up-down direction), and the Z direction corresponds to the front-rear direction. That is, the Z direction is an optical axis direction of an optical axis OA of a lens portion 2 illustrated in FIG. 2, and the upper side (+Z side) in FIG. 2 is a light receiving side of the optical axis direction, and the lower side (−Z side) in FIG. 2 is an image forming side of the optical axis direction.

The optical axis OA is used in the following description; however, the optical axis direction of the optical axis OA may be rephrased as an optical path direction, a focus direction (direction to which the focus is adjusted) according to the type of optical element. The optical path is a path through which light passes and that is composed of an opening 301 of a cover 3 (described below), an opening 11 of a holding portion 10 (described below), or a housing opening 21 of a housing portion 20 (described below), and the optical path direction is the direction in which the optical path extends (direction in which the openings pass through).

As illustrated in FIGS. 2 and 3, the camera module A includes the optical element driving device 1 that implements the AF function, the lens portion 2 in which a lens is housed in a cylindrical lens barrel, the imaging unit 5 that captures a subject image formed by the lens portion 2, and the like. Thus, the optical element driving device 1 is a lens driving device that drives the lens portion 2 as an optical element.

In the present embodiment, in consideration of mounting of the optical element driving device 1 on the camera module A described above or the like, the optical element driving device 1 is shorter in length in the Z direction than in the X direction and the Y direction, and has a low height when the Z direction corresponds to the height direction.

[Cover]

In the optical element driving device 1, the outside of the optical element driving device body 4 is covered with the cover 3. The cover 3 is a lidded quadrangular prism body having a substantially rectangular shape in plan view in the Z direction. In the present embodiment, the cover 3 has a substantially square shape in plan view. The upper surface of the cover 3 has the opening 301 having a substantially circular shape. The lens portion 2 is housed in the opening 11 of the holding portion 10 of the optical element driving device body 4, faces the outside of the optical element driving device body 4 from the opening 301 of the cover 3, and is configured to protrude from the open surface of the cover 3 toward the light receiving side due to movement in the Z direction. An inner wall of the cover 3 is fixed to the housing portion 20 (e.g., a bottom portion 22*a* (described below)) of the optical element driving device body 4, for example, by adhesion, to house the optical element driving device body 4.

The cover 3 includes a member that blocks an electromagnetic wave from the outside of the optical element driving device 1 and the inside of the cover 3, for example, a shielding member made of a magnetic substance.

[Imaging Unit]

The imaging unit 5 is provided on the image forming side of the optical element driving device 1. The imaging unit 5 includes, for example, an image sensor substrate 501, and an imaging element 502 and a control unit 503 that are mounted on the image sensor substrate 501. The imaging element 502 is composed of, for example, a charge-coupled device (CCD) type image sensor, a complementary metal-oxide semiconductor (CMOS) type image sensor, or the like, and captures a subject image formed by the lens portion 2.

The control unit 503 is composed of, for example, a control IC, and controls driving of the entire optical element driving device 1. The optical element driving device 1 is mounted on the image sensor substrate 501, and is mechanically and electrically connected to the image sensor substrate 501. The control unit 503 may be mounted on the image sensor substrate 501, or may be mounted on a camera-equipped device (the smartphone M in the present embodiment) equipped with the camera module A.

In FIG. 2, a subject image is formed on the imaging element 502 by driving the lens portion 2 in the Z direction in the optical element driving device 1 with respect to the image sensor substrate 501 located at a fixed position; however, for example, the imaging element 502 may be driven in the Z direction. In such a case, a subject image may be formed on the imaging element 502 by fixing the lens portion 2 to the cover 3 and driving the imaging element 502 as an optical element in the Z direction in the optical element driving device 1.

[Optical Element Driving Device Body]

The optical element driving device body 4 is a main body portion of the optical element driving device 1 that drives the lens portion 2 as an optical element in the Z direction. In the following description, for convenience of description, the optical element driving device 1 is assumed to drive the lens portion 2; however, as described above, the optical element driving device 1 may drive the imaging element 502.

As illustrated in FIG. 3, the optical element driving device body 4 includes the holding portion 10, the housing portion 20, support portions 30A, 30B, and 30C, drive units 40A and 40B, a substrate portion 50, and the like.

[Holding Portion]

The holding portion 10 has a frame portion 12 that has a center portion having the opening 11, and the lens portion 2 can be held in the opening 11. For example, an inner peripheral surface of the opening 11 has an attaching groove or the like that allows the lens portion 2 to be held on the inner peripheral surface. Thus, the holding portion 10 surrounds an outer periphery of the lens portion 2 to hold the lens portion 2.

On an outer peripheral surface 13 that is a surface of the frame portion 12 on the outer peripheral side, the support portions 30A, 30B, and 30C extending along the Z direction support a plurality of (three, as an example, in FIG. 3) portions of the outer peripheral surface 13 so that the outer peripheral surface 13 is movable in the Z direction.

Furthermore, a plurality of (two, as an example, in FIG. 3) portions of the outer peripheral surface 13 are held by the drive units 40A and 40B, and the holding portion 10 is movable in the Z direction by the drive units 40A and 40B.

Furthermore, magnets 14A and 14B for detecting a position in the Z direction are provided on a plurality of (two, as an example, in FIG. 3) portions of the outer peripheral surface 13. Position detection sensors 54A and 54B (described below) are provided so as to face the magnets 14A and 14B, respectively.

The opening 11 has a cylindrical shape corresponding to the lens portion 2 having a cylindrical shape; however, the shape of the opening 11 can be changed to an appropriate shape according to the shape of the lens portion 2.

When the optical element driving device 1 drives the imaging element 502, the holding portion 10 may not necessarily have the opening 11, that is, the holding portion 10 may not necessarily have a frame portion, and in such a case, for example, the imaging element 502 may be held on the upper surface (the surface on the light receiving side) of the holding portion 10.

[Housing Portion]

The housing portion 20 has a frame portion 22 that has a center portion having the housing opening 21, and the housing opening 21 surrounds an outer periphery of the holding portion 10 so that the holding portion 10 can be housed in the housing opening 21.

The support portions 30A, 30B, and 30C are provided on a plurality of portions of an inner peripheral surface 23 that is a surface of the housing opening 21 on the inner side. In the housing portion 20, the support portions 30A, 30B, and 30C support the holding portion 10 so that the holding portion 10 is movable in the Z direction.

Furthermore, the drive units 40A and 40B are provided on a plurality of portions of the inner peripheral surface 23. The drive units 40A and 40B provided in the housing portion 20 move the holding portion 10 in the Z direction. The holding portion 10 functions as a movable portion driven by the drive units 40A and 40B, and the housing portion 20 functions as a fixing portion for the holding portion 10.

The inner peripheral surface 23 has a shape corresponding to the shape of the outer peripheral surface 13 of the holding portion 10 in plan view. In FIG. 3, the shapes of the outer peripheral surface 13 of the holding portion 10 and the inner peripheral surface 23 of the housing opening 21 are examples, and can be changed as appropriate, for example, according to the arrangement of the support portions 30A, 30B, and 30C or the drive units 40A and 40B.

The frame portion 22 has the bottom portion 22a and a side wall portion 22b. The inner wall of the cover 3 described above is fixed to the bottom portion 22a, for example, by adhesion. The substrate portion 50 is attached, along an outer peripheral surface 24 that is a surface of the side wall portion 22b on the outer peripheral side, to the outer peripheral surface 24.

[Support Portion]

The support portions 30A, 30B, and 30C support the holding portion 10 so that the holding portion 10 is movable in the Z direction with respect to the housing portion 20. As illustrated in FIG. 3, the support portions 30A, 30B, and 30C are provided at the respective three distributed positions in the circumferential direction on the inner peripheral surface 23 (outer peripheral surface 13).

Although not illustrated in detail, each of the support portions 30A, 30B, and 30C has a first groove portion that is provided on the outer peripheral surface 13 of the holding portion 10, a second groove portion that is provided on the inner peripheral surface 23 of the housing portion 20, and a rolling member (e.g., a ball member, etc.) that is rollably held between the first groove portion and the second groove portion.

In the support portions 30A, 30B, and 30C, the first groove portion and the second groove portion are provided to extend in the Z direction and face each other. The rolling member is rollably held between the first groove portion and the second groove portion provided in this manner.

One or more rolling members are provided between the first groove portion and the second groove portion. When a plurality of rolling members are provided between the first groove portion and the second groove portion, it is possible to more stably prevent tilting of the holding portion 10. In this case, the plurality of rolling members are arranged along the Z direction, and are held by a retainer (not illustrated) so that a constant distance is maintained between the plurality of rolling members and that positioning of the plurality of rolling members in the Z direction can be performed.

The support portions 30A, 30B, and 30C configured in this manner support the holding portion 10 so that the holding portion 10 is movable in the Z direction with respect to the housing portion 20.

A rail member that is made of a metal material or the like and on which the one or more rolling members are rollable may be attached to the first groove portion and the second groove portion. The holding portion 10 and the housing portion 20 are usually made of a resin or the like, and the one or more rolling members are usually made of a material such as ceramic or an alloy. In the case where the first groove portion and the second groove portion are provided with the rail member made of a metal material or the like that is harder than the holding portion 10 and the housing portion 20, even when a compression force from the one or more rolling members is applied to the first groove portion and the second groove portion, the first groove portion and the second groove portion are less likely to be deformed. This configuration enables the support portions 30A, 30B, and 30C to stably support the holding portion 10 so that the holding portion 10 is movable in the Z direction.

[Drive Unit]

The drive units 40A and 40B drive the holding portion 10 in the Z direction with respect to the housing portion 20. As illustrated in FIG. 3, the drive units 40A and 40B are provided at the respective two distributed positions in the circumferential direction on the inner peripheral surface 23 (outer peripheral surface 13). In the optical element driving device body 4, the support portions 30A, 30B, and 30C described above and the drive units 40A and 40B can drive the lens portion 2 together with the holding portion 10 in the Z direction, thus implementing the AF function.

As illustrated in FIG. 3, the frame portion 22 of the housing portion 20 has four corner portions 22bA, 22bB, 22bC, and 22bD. In the example illustrated in FIG. 3, the support portion 30A is provided in the corner portion 22bA; thus, the drive units 40A and 40B are respectively arranged in the corner portions 22bB and 22bC that are corners different from the corner portion 22bA and are located at point symmetrical positions with respect to the optical axis OA in plan view. This arrangement makes it possible to stably move the holding portion 10 even when an optical element such as the lens portion 2 has a larger weight.

As the drive units 40A and 40B, ultrasonic motors that are actuators including a piezoelectric element are used.

Figure 4A:
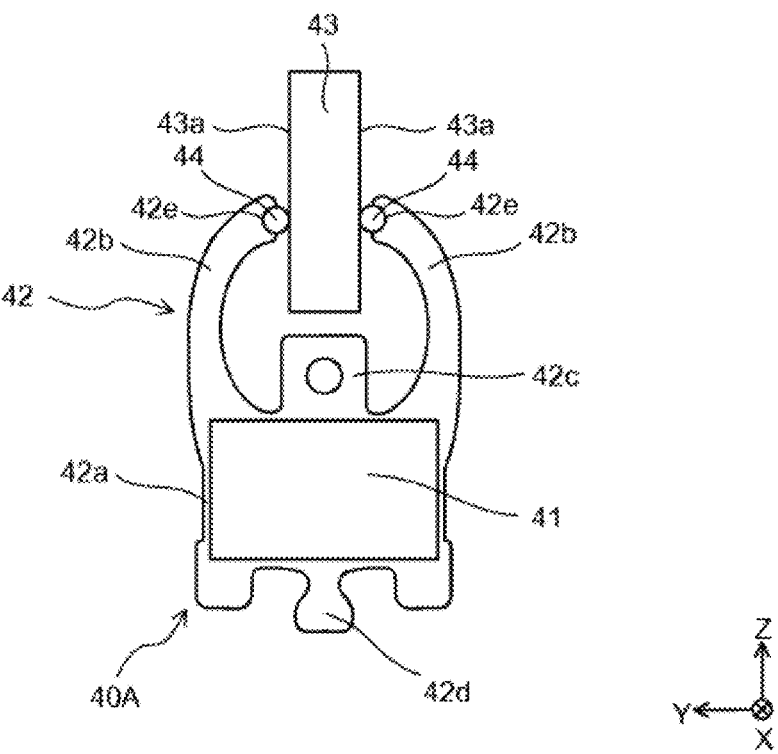
FIG. 4A is a diagram illustrating a drive unit of the optical element driving device body illustrated in FIG. 3.
Figure 4B:
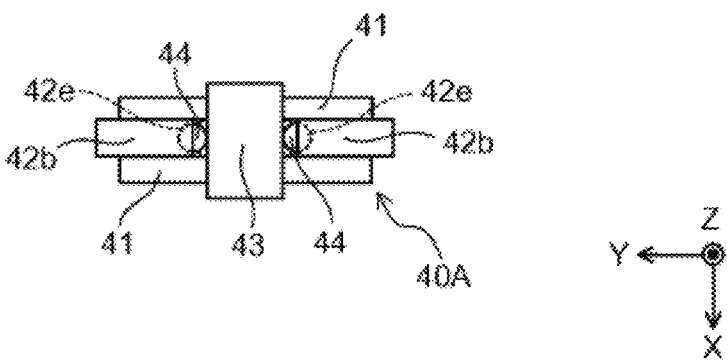
FIG. 4B is a diagram illustrating the drive unit illustrated in FIG. 4A as viewed from the upper side in the Z direction.

The drive units 40A and 40B will be described with reference to FIGS. 4A and 4B. FIG. 4A is a diagram illustrating the drive unit 40A of the optical element driving device body 4 illustrated in FIG. 3. FIG. 4B is a diagram illustrating the drive unit 40A illustrated in FIG. 4A as viewed from the upper side in the Z direction. Although FIGS. 4A and 4B illustrate the drive unit 40A, the drive unit 40B has a configuration equivalent to that of the drive unit 40A, and the configuration of the drive unit 40B is not illustrated or described in detail.

The drive unit 40A includes piezoelectric elements 41, a resonance unit 42, a power transmission unit 43 (moving portion in the present invention), and the like. A driving force generated by the resonance unit 42 in resonance with vibration of the piezoelectric elements 41 is transmitted to the power transmission unit 43. Although not illustrated, the power transmission unit 43 is fixed to the holding portion 10 side, and the driving force generated by the resonance unit 42 is transmitted to the holding portion 10 via the power transmission unit 43. In the drive unit 40A, the resonance unit 42 constitutes an active element, and the power transmission unit 43 constitutes a passive element.

The piezoelectric elements 41 are each, for example, a plate-shaped element made of a ceramic material, and when a high-frequency voltage is applied to the piezoelectric elements 41, the piezoelectric elements 41 generate vibration, for example, vibration at a vibration frequency in the ultrasonic range. Two piezoelectric elements 41 are provided so that a barrel portion 42a (main body in the present invention) of the resonance unit 42 is held between the piezoelectric elements 41. Although not illustrated, a connecting wire of an FPC 51 (described below) is electrically connected to the piezoelectric elements 41 to apply a voltage to the piezoelectric elements 41.

The resonance unit 42 is composed of a plate member made of a conductive material, and converts a vibratory motion into a linear motion in resonance with vibration of the piezoelectric elements 41. The resonance unit 42 is formed, for example, by laser processing, etching, pressing, or the like of a metal plate.

The resonance unit 42 has the barrel portion 42a, a pair of arm portions 42b, a protruding portion 42c, an energization portion 42d, and the like. The resonance unit 42 further has abutment members 44 (described below).

The barrel portion 42a is a substantially rectangular portion, and the two piezoelectric elements 41 are adhered to the front and back of the barrel portion 42a. Vibration generated by the piezoelectric elements 41 is transmitted to the pair of arm portions 42b via the barrel portion 42a.

The pair of arm portions 42b extend in the Z direction from both side portions of the barrel portion 42a to tip portions as free ends of the respective arm portions 42b. The pair of arm portions 42b have a symmetrical shape, and are symmetrically deformed in resonance with vibration of the piezoelectric elements 41. The pair of arm portions 42b are configured such that the power transmission unit 43 is held between the free ends of the pair of arm portions 42b. More specifically, the free ends of the pair of arm portions 42b extend inward and abut abutment surfaces 43a of the power transmission unit 43 (described below). In the present embodiment, as described below, the pair of arm portions 42b abut the abutment surfaces 43a of the power transmission unit 43 via the abutment members 44. Each of the pair of arm portions 42b has a member housing portion (sphere housing portion 42e in this case) as a recess that houses the corresponding abutment member 44.

The protruding portion 42c extends in the Z direction from a center portion of the barrel portion 42a. The protruding portion 42c has a through hole through which a rivet or the like is inserted. The protruding portion 42c is fixed to the housing portion 20 side using a rivet or the like.

The energization portion 42d extends from the center portion of the barrel portion 42a in the direction opposite to the direction in which the protruding portion 42c extends. The energization portion 42d constitutes a feed line to the piezoelectric elements 41 via the barrel portion 42a, and although not illustrated, a connecting wire of the FPC 51 is electrically connected to the energization portion 42d.

Due to the electrical connection described above, a voltage is applied to the piezoelectric elements 41 bonded to the barrel portion 42a in the thickness direction, generating vibration. The resonance unit 42 has at least two resonance frequencies, and is deformed through different behaviors for the respective resonance frequencies. In other words, the shape of the entire resonance unit 42 is set so that the resonance unit 42 is deformed through different behaviors for the two resonance frequencies.

The different behaviors are a behavior in which the pair of arm portions 42b move the power transmission unit 43 forward in the Z direction, and a behavior in which the pair of arm portions 42b move the power transmission unit 43 backward in the Z direction. Thus, by vibrating the resonance unit 42 at a desired resonance frequency, the pair of arm portions 42b can move the power transmission unit 43 forward or backward in the Z direction.

The power transmission unit 43 has, for example, a rectangular parallelepiped shape having a predetermined length in the Z direction, and has the abutment surfaces 43a that the abutment members 44 (described below) abut and are located at portions of the power transmission unit 43 facing the pair of arm portions 42b. As described above, the pair of arm portions 42b abut the abutment surfaces 43a, and the power transmission unit 43 functions as a chucking guide for the pair of arm portions 42b. For example, an end portion of the power transmission unit 43 on the upper side (+Z side) in FIG. 4A is attached to the outer peripheral surface 13 of the frame portion 12 of the holding portion 10.

In the power transmission unit 43, at least the abutment surfaces 43a or the entire power transmission unit 43 is made of ceramic. As ceramic, for example, zirconia, alumina, or the like can be used. When only the abutment surfaces 43a are made of ceramic, for example, a plate material made of ceramic may be provided in the power transmission unit 43 to form the abutment surfaces 43a (surfaces).

The abutment members 44 are fixed to the sphere housing portions 42e at the tip portions (free ends) of the pair of arm portions 42b, and abut the abutment surfaces 43a of the power transmission unit 43. The abutment members 44 are made of ceramic. As ceramic, for example, zirconia, alumina, or the like can be used. The abutment members 44 are each composed of, for example, a spherical ball member.

A conventional ultrasonic motor will be described with reference to FIG. 4A in which the tips of the pair of arm portions 42b abut the abutment surfaces 43a and the power transmission unit 43 is moved while the tips of the arm portions 42b and the abutment surfaces 43a are in frictional contact with each other due to vibration of the piezoelectric elements 41.

In this case, the tips of the arm portions 42b and the abutment surfaces 43a in frictional contact with each other generate a louder driving sound than, for example, a voice coil motor or the like. This is because one or both of the members in frictional contact with each other are shaved, thus generating a loud driving sound. For example, when the members in frictional contact with each other are made of stainless steel, one or both of the stainless steel members are shaved, generating a loud driving sound.

Therefore, in the present embodiment, in the power transmission unit 43, at least the abutment surfaces 43a or the entire power transmission unit 43 is made of, for example, ceramic. Furthermore, the abutment members 44 are provided at the tips of the pair of arm portions 42b, and the abutment members 44 are made of, for example, ceramic.

Thus, the abutment members 44 of the resonance unit 42 and the abutment surfaces 43a of the power transmission unit 43 that abut each other are both made of ceramic. Therefore, the abutment members 44 and the abutment surfaces 43*a* have high and equivalent hardness, and this prevents the members from being shaved, thus achieving a less driving sound.

The present inventors have confirmed that by using ceramic to form the abutment members 44 and the abutment surfaces 43*a* that are the members in frictional contact with each other, the driving sound is reduced by at least 5 to 10 dB as compared with the conventional configuration, for example, the configuration in which the members in frictional contact with each other are made of stainless steel.

In the conventional configuration, depending on the processing accuracy, the position accuracy during assembly, or the like of the resonance unit 42 and the power transmission unit 43, the tips of the pair of arm portions 42*b* and the corresponding abutment surfaces 43*a* abut each other with different forces or in an asymmetrical direction. That is, the conventional configuration has variation in the abutting state of the tips of the pair of arm portions 42*b* and the corresponding abutment surfaces 43*a*.

On the other hand, in the present embodiment, the abutment members 44 are each composed of a spherical ball member. This enables the abutment members 44 at the tips of the pair of arm portions 42*b* and the corresponding abutment surfaces 43*a* to abut each other with equivalent or substantially equivalent forces and in a symmetrical or substantially symmetrical direction, preventing variation in the abutting state. Thus, it is possible to prevent variation in the abutting state, allowing easy assembly of the resonance unit 42, the power transmission unit 43, and the like.

In the configuration described above, when a voltage is applied to the piezoelectric elements 41 of the drive unit 40A, the piezoelectric elements 41 are vibrated, and the resonance unit 42 is deformed through a behavior corresponding to the frequency, and the pair of arm portions 42*b* are also deformed through a behavior corresponding to the frequency. The pair of arm portions 42*b* abut the power transmission unit 43 so that the power transmission unit 43 is pressed inward. A driving force generated by deformation of the pair of arm portions 42*b* is transmitted to the power transmission unit 43, and the power transmission unit 43 is moved relative to the resonance unit 42 in the Z direction. Thus, the driving force of the drive unit 40A is transmitted to the holding portion 10, causing the holding portion 10 to be moved in the Z direction to perform focusing.

In the present embodiment, as described above, the abutment members 44 of the resonance unit 42 and the abutment surfaces 43*a* of the power transmission unit 43 that abut each other are made of ceramic having high hardness, thus achieving a less driving sound.

[Substrate Portion]

The substrate portion 50 includes a circuit that drives the drive units 40A and 40B. The substrate portion 50 includes the FPC (flexible printed circuit) 51, a driver IC 52, the position detection sensors 54A and 54B, and the like.

The FPC 51 is a substrate having flexibility, and is composed of a laminate of a thin insulating layer such as a resin film, and a metal layer such as a copper foil. Although not illustrated, the metal layer serves as a circuit of a signal line and a power supply line, and the drive units 40A and 40B, the driver IC 52, the position detection sensors 54A and 54B, and the like are electrically connected to the metal layer.

The driver IC 52 is an IC that controls a driving signal for driving the drive units 40A and 40B. The driver IC 52 outputs a driving signal, for example, based on a detection signal detected by the position detection sensors 54A and 54B, and the driving signal is output to the drive units 40A and 40B.

The position detection sensors 54A and 54B are each, for example, a magnetic sensor such as a Hall element. The position detection sensor 54A detects a strength of the magnetic force of the magnet 14A facing the position detection sensor 54A, and the position detection sensor 54B detects a strength of the magnetic force of the magnet 14B facing the position detection sensor 54B. Thus, the position detection sensors 54A and 54B acquire a relative position between the holding portion 10 and the housing portion 20 in the Z direction, and output the relative position as a detection signal. In this case, the substrate portion 50 includes two position detection sensors 54A and 54B. However, the substrate portion 50 may include a single position detection sensor, and in such a case, the optical element driving device body 4 may include a single magnet facing the position detection sensor.

Although not illustrated, the FPC 51 includes a connecting wire electrically connected to the drive units 40A and 40B.

The FPC 51 may include an inductor that raises the voltage (input voltage) of a driving signal input from the driver IC 52 and outputs the voltage to each of the drive units 40A and 40B.

In order to mount the driver IC 52 and the position detection sensors 54A and 54B described above on the FPC 51, the FPC 51 is composed of a single elongated substrate. The FPC 51 is provided along the outer peripheral surface 24 of the frame portion 22 of the housing portion 20 so as to extend around substantially the entire outer peripheral surface 24.

The FPC 51 is provided along the outer peripheral surface 24; thus, for example, a portion of the outer peripheral surface 24 at the corner portion 22*b*A has an arc shape in plan view. This enables the FPC 51 to be placed in close contact with the portion of the outer peripheral surface 24 at the corner portion 22*b*A. Thus, the cover 3 provided on the outer side of the FPC 51 does not need to be large in size, and this allows the entire device to have a smaller size, leading to lower cost.

[Other Embodiments]

The present invention is not limited to the above embodiment, and can be modified without departing from the gist of the present invention.

For example, in the above embodiment, the smartphone M has been described as an example; however, the present invention is applicable to a camera-equipped device including a camera module, and an image processing unit that processes image information obtained by the camera module. The camera-equipped device may be an information device or a transportation device. Examples of the information device include a camera-equipped mobile phone, a laptop personal computer, a tablet terminal, a handheld game console, a web camera, and a camera-equipped in-vehicle device (e.g., a back monitor device, a driving recorder device). Examples of the transportation device include an automobile and a drone.

Figure 5A:
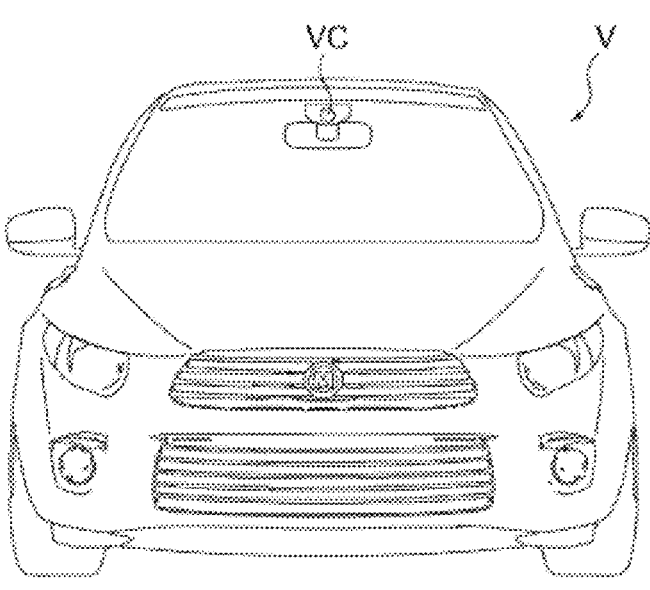
FIG. 5A is a front view of an automobile as a camera-equipped device equipped with an in-vehicle camera module.
Figure 5B:
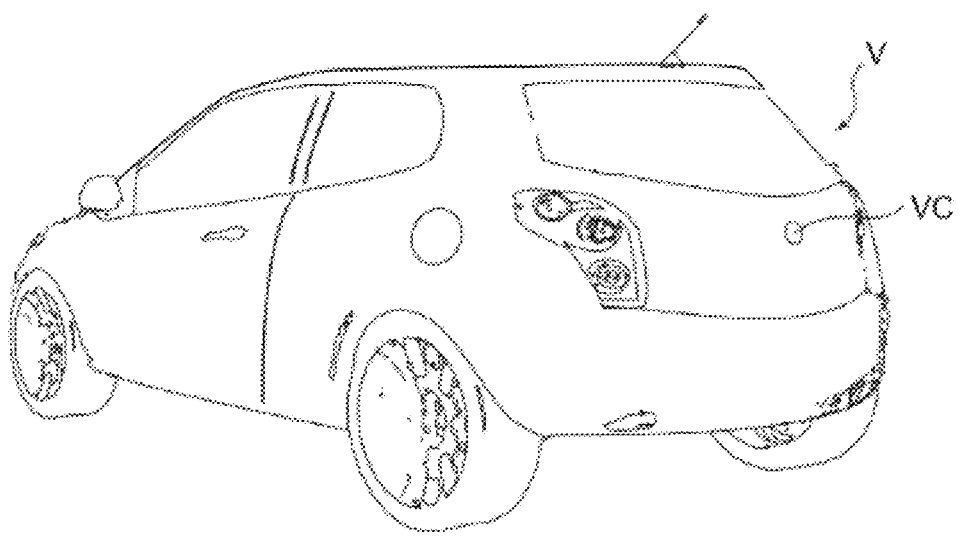
FIG. 5B is a perspective view of the automobile illustrated in FIG. 5A as obliquely viewed from the rear side.

FIGS. 5A and 5B are diagrams illustrating an automobile V as a camera-equipped device equipped with an in-vehicle camera module VC (vehicle camera). FIG. 5A is a front view of the automobile V, and FIG. 5B is a rear side perspective view of the automobile V. The automobile V is equipped, as the in-vehicle camera module VC, with the camera module A described in the above embodiment. As illustrated in FIGS. 5A and 5B, for example, the in-vehicle camera module VC is attached to a windshield so as to be oriented toward the front, or is attached to a rear gate so as to be oriented toward the rear. The in-vehicle camera module VC is used for a back monitor, for a driving recorder, for collision avoidance control, for automated driving control, or the like.

In the above embodiment, the optical element driving device 1 that drives the lens portion 2 as an optical element has been described; however, the optical element to be driven may be an optical element other than a lens, such as a mirror or a prism, or may be an optical element such as the imaging element 502. In such a case, the shape of the opening 11 of the holding portion 10 may be changed according to the shape of the optical element attached to the opening 11, or in some cases, the holding portion 10 may not necessarily have the opening 11.

In the above embodiment, the optical element driving device 1 has the AF function; however, the optical element driving device 1 may have not only the AF function but also the function of moving the lens portion 2 in the Z direction, such as a zoom function.

In the above embodiment, the optical element driving device 1 having the AF function has been described as an example; however, the optical element driving device 1 may have the OIS function. When the optical element driving device 1 has the OIS function, the optical element driving device 1 includes a base portion that supports, via an OIS support portion, the housing portion 20 so that the housing portion 20 is movable in the X direction and the Y direction, and an OIS drive unit that drives the housing portion 20 in the X direction and the Y direction with respect to the base portion. In this case, as the OIS drive unit, for example, the drive unit 40A described above may be used to drive the housing portion 20 in the X direction and the Y direction.

In the above embodiment, the abutment members 44 are each composed of a spherical ball member; however, the shape of the abutment members 44 is not limited to this shape, and may be another shape. For example, the abutment members 44 may have a cylindrical shape or a semicylindrical shape so that the curved surfaces of the abutment members 44 abut the abutment surfaces 43a.

In the above embodiment, the sphere housing portions 42e and the abutment members 44 are provided at the tips of the arm portions 42b; however, instead of providing the sphere housing portions 42e and the abutment members 44, the tips of the arm portions 42b may be coated with ceramic. Similarly, the abutment surfaces 43a of the power transmission unit 43 may be coated with ceramic.

In the above embodiment, the optical element driving device 1 is configured such that the power transmission unit 43 is held between the free ends of the pair of arm portions 42b of the resonance unit 42; however, the configuration of the optical element driving device 1 is not limited to this configuration and may be another configuration as long as the resonance unit 42 and the power transmission unit 43 abut each other. For example, the optical element driving device 1 may be configured such that power transmission units 43 are provided on the outer side of the respective pair of arm portions 42b and that the free ends of the pair of arm portions 42b extend outward and abut the power transmission units 43. Alternatively, the optical element driving device 1 may be configured such that the resonance unit 42 has a single arm portion 42b and that a free end of the single arm portion 42b and the power transmission unit 43 abut each other.

In the above embodiment, the resonance unit 42 is fixed to the housing portion 20 side, and the power transmission unit 43 is fixed to the holding portion 10 side; however, the optical element driving device 1 may be configured such that the resonance unit 42 is fixed to the holding portion 10 side and the power transmission unit 43 is fixed to the housing portion 20 side.

The embodiments of the present invention have been described. The above describes examples of preferable embodiments of the present invention, and the scope of the present invention is not limited thereto. That is, the configuration of the device and the shapes of the portions described above are examples, and it is clear that various modifications and additions can be made to these examples within the scope of the present invention.

It is useful to mount the optical element driving device and the camera module according to the present invention, for example, on a camera-equipped device such as a smartphone, a mobile phone, a digital camera, a laptop personal computer, a tablet terminal, a handheld game console, an in-vehicle camera, or a drone.

What is claimed is:

1. A driving device comprising:
a resonance unit that has a pair of arm portions and resonates with vibration of a piezoelectric element; and
a moving portion that abuts the pair of arm portions and is moved relative to the resonance unit due to vibration of the resonance unit, wherein
a portion of the resonance unit and a portion of the moving portion that abut each other are each made of ceramic, and
each of the pair of arm portions has, as a portion that abuts the moving portion, a sphere made of ceramic.

2. The driving device according to claim 1, wherein an entire portion of the moving portion is made of ceramic.

3. The driving device according to claim 1, wherein a surface of the moving portion that abuts the resonance unit is made of ceramic.

4. The driving device according to claim 1, wherein each of the pair of arm portions has a sphere housing portion that houses the sphere.

5. An optical element driving device comprising:
a holding portion that is capable of holding an optical element;
a housing portion that houses the holding portion so that the holding portion is movable in an optical path direction of the optical element; and
the driving device according to claim 1 that drives the holding portion.

6. A camera module comprising:
the optical element driving device according to claim 5; and
an imaging unit that captures a subject image using the optical element.

7. A camera-equipped device that is an information device or a transportation device, the camera-equipped device comprising:
the camera module according to claim 6; and
an image processing unit that processes image information obtained by the camera module.

* * * * *